(12) United States Patent
Kamijo (10) Patent No.: US 11,609,454 B2
(45) Date of Patent: Mar. 21, 2023

(54) SURFACE LIGHT SOURCE DEVICE AND DISPLAY DEVICE

(71) Applicant: Enplas Corporation, Kawaguchi (JP)

(72) Inventor: Yu Kamijo, Saitama (JP)

(73) Assignee: Enplas Corporation, Kawaguchi (JP)

( * ) Notice: Subject to any disclaimer, the term of this patent is extended or adjusted under 35 U.S.C. 154(b) by 0 days.

(21) Appl. No.: 17/878,104

(22) Filed: Aug. 1, 2022

(65) Prior Publication Data

US 2023/0037940 A1    Feb. 9, 2023

(30) Foreign Application Priority Data

Aug. 6, 2021  (JP) ............................. JP2021-129925

(51) Int. Cl.
  *G02F 1/00*      (2006.01)
  *G02F 1/13357*   (2006.01)

(52) U.S. Cl.
  CPC .. *G02F 1/133606* (2013.01); *G02F 1/133603* (2013.01)

(58) Field of Classification Search
  CPC ................... G02F 1/133601–133606
  See application file for complete search history.

(56) References Cited

U.S. PATENT DOCUMENTS

| | | | | |
|---|---|---|---|---|
| 8,147,100 B2* | 4/2012 | Yamaguchi | ........ | G02B 19/0061 362/555 |
| 11,467,446 B2* | 10/2022 | Park | ..................... | G02B 6/0018 |
| 2008/0158875 A1* | 7/2008 | Kim | ................... | G02B 27/0955 362/244 |
| 2009/0296405 A1* | 12/2009 | Tetsuo | ............... | G02B 19/0014 362/335 |
| 2012/0057326 A1* | 3/2012 | Zheng | ............... | G02F 1/133611 362/84 |
| 2012/0287375 A1* | 11/2012 | Matsuki | ............ | G02F 1/133605 362/326 |
| 2018/0188608 A1* | 7/2018 | Fujii | ......................... | G02B 3/00 |
| 2020/0103707 A1* | 4/2020 | Jongewaard | ....... | G02B 19/0071 |

FOREIGN PATENT DOCUMENTS

WO    2011/096192    8/2011

\* cited by examiner

*Primary Examiner* — Gerald J Sufleta, II
(74) *Attorney, Agent, or Firm* — Amin, Turocy & Watson, LLP (57) ABSTRACT

A surface light source device includes a substrate, a plurality of light emitting devices and a light diffusion member. The light flux controlling member includes an incidence surface and an emission surface. In one light emitting device among the plurality of light emitting devices, light—emitted from the light emitting center of the light emitting element at an emission angle of 80° or less with respect to the optical axis of the light emitting element, incident on the incidence surface, and emitted from the emission surface—reaches the light diffusion member without reaching another light emitting device among the plurality of light emitting devices.

6 Claims, 10 Drawing Sheets

SURFACE LIGHT SOURCE DEVICE AND DISPLAY DEVICE

This application is entitled to the benefit of Japanese Patent Application No. 2021-129925, filed on Aug. 6, 2021, the disclosure of which including the specification, drawings and abstract is incorporated herein by reference in its entirety.

TECHNICAL FIELD

The present invention relates to a surface light source device and a display device.

BACKGROUND ART

In recent years, a direct surface light source device including a plurality of light emitting elements as a light source is used in transmission image display devices, such as liquid crystal display devices. A large number of light emitting elements may be disposed to allow light to illuminate a wide range in such a direct surface light source device (see, for example, Patent Literature (hereinafter, referred to as PTL) 1).

PTL 1 discloses a surface light source device including a substrate, a plurality of light emitting diodes disposed in a matrix on a substrate, a plurality of lenses disposed so as to cover respective light emitting diodes, and a diffusion plate disposed so as to face the plurality of lenses. Each lens includes an incidence surface, which is an inner surface of a recess formed on the back side of the lens, and an emission surface, which is formed on the front side of the lens and is convex in a direction from the back side toward the front side. Light emitted from the light emitting diodes is incident on the incidence surfaces and then emitted from the emission surfaces so as to be expanded over the entire diffusion plate. As a result, the light emitted from the light emitting diodes illuminates the entire diffusion plate.

CITATION LIST

Patent Literature

PTL 1
WO2011/096192

SUMMARY OF INVENTION

Technical Problem

In the surface light source device described in PTL 1, the lens expands the light emitted from the light emitting diode in the planar direction of the diffusion plate. Part of the light emitted from a first lens may thus directly reach an adjacent second lens. Part of the light that has reached the second lens from the first lens passes through the second lens and is reflected by the substrate, and then passes through the second lens again and reaches the diffusion plate. This means that part of the light emitted from a lens passes through another lens in the surface light source device described in PTL 1, which may cause unintended luminance unevenness.

An object of the present invention is to provide a surface light source device capable of reducing luminance unevenness that would be caused by light emitted from a light emitting element passing through a plurality of light flux controlling members, even when each light flux controlling member, which controls the distribution of light emitted from the light emitting element, expands the light. Another object of the present invention is to provide a display device including the surface light source device.

Solution to Problem

A surface light source device according to an embodiment of the present invention includes: a substrate; a plurality of light emitting devices each including a light emitting element disposed on the substrate and a light flux controlling member for controlling a distribution of light emitted from the light emitting element; and a light diffusion member for transmitting light emitted from the plurality of light emitting devices while diffusing the light, in which the light flux controlling member includes an incidence surface that is an inner surface of a recess disposed on a back side of the light flux controlling member so as to intersect a central axis of the light flux controlling member, the incidence surface being for allowing incidence of the light emitted from the light emitting element; and an emission surface disposed on a front side of the light flux controlling member so as to intersect the central axis, the emission surface being for allowing emission of the light incident on the incidence surface to an outside of the light flux controlling member, and in which in at least one light emitting device among the plurality of light emitting devices, regarding light that is emitted from a light emitting center of the light emitting element at an emission angle of 80° or less with respect to an optical axis of the light emitting element, incident on the incidence surface, and emitted from the emission surface, the light reaches the light diffusion member without reaching another light emitting device among the plurality of light emitting devices.

A display device according to an embodiment of the present invention includes the surface light source device of the present invention and a display member to be illuminated by light emitted from the surface light source device.

Advantageous Effects of Invention

The present invention can reduce luminance unevenness that would be caused by light emitted from a light emitting element passing through a plurality of light flux controlling members.

DESCRIPTION OF EMBODIMENTS

Hereinafter, one or more embodiments of the present invention will be described in detail with reference to the drawings. In the following description, a surface light source device suitable for a backlight of a liquid crystal display device or the like will be described as a typical example of the surface light source device according to the present invention. Such a surface light source device can be used as display device 100' in combination with display member 102 (such as a liquid crystal panel), which is to be illuminated with light from the surface light source device (see FIG. 1B).

Configuration of Surface Light Source Device

Figure 1A:
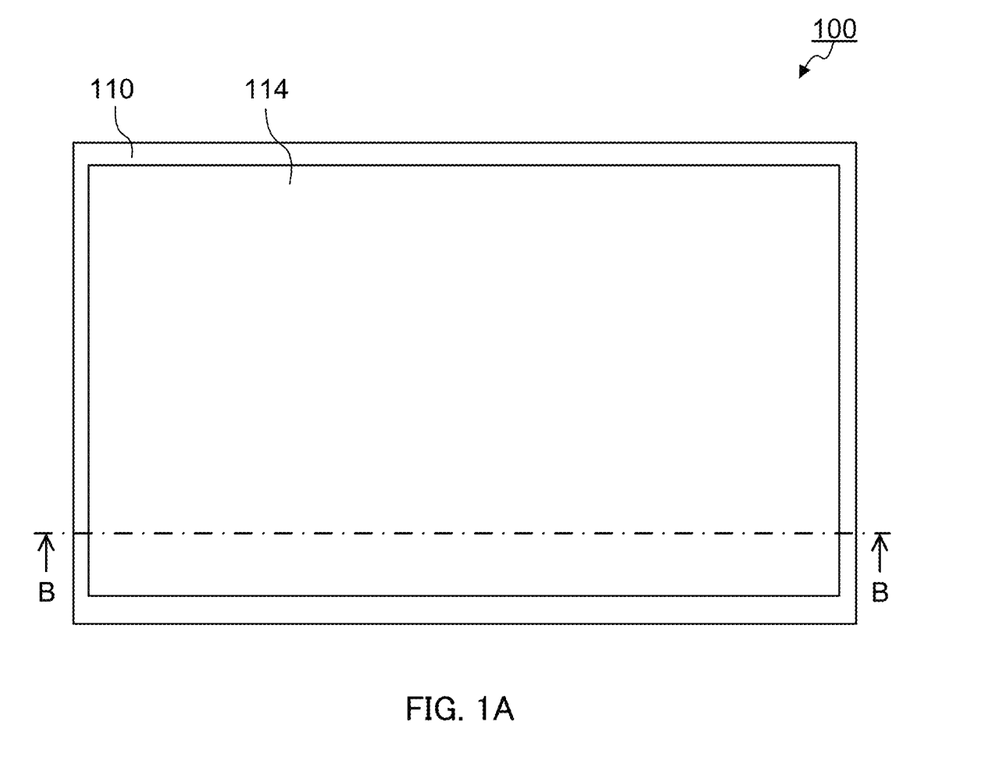
FIGS. 1A and 1B illustrate a configuration of a surface light source device according to an embodiment of the present invention.
Figure 1B:
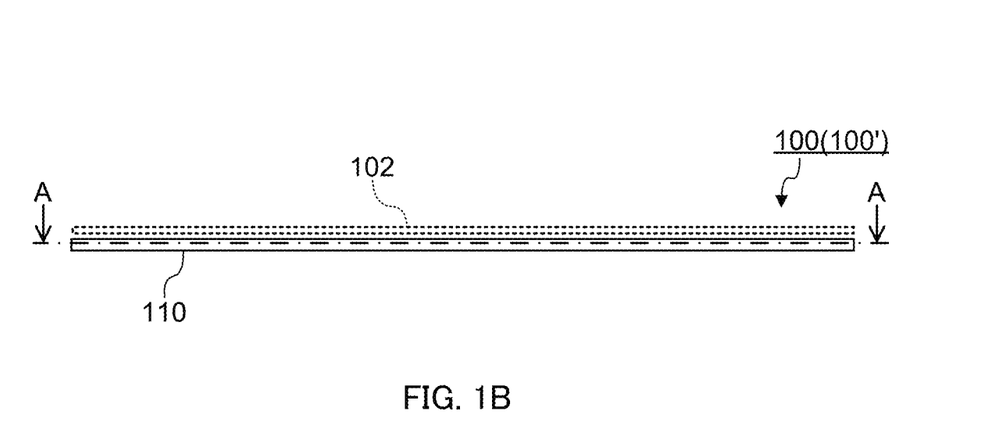
Figure 2A:
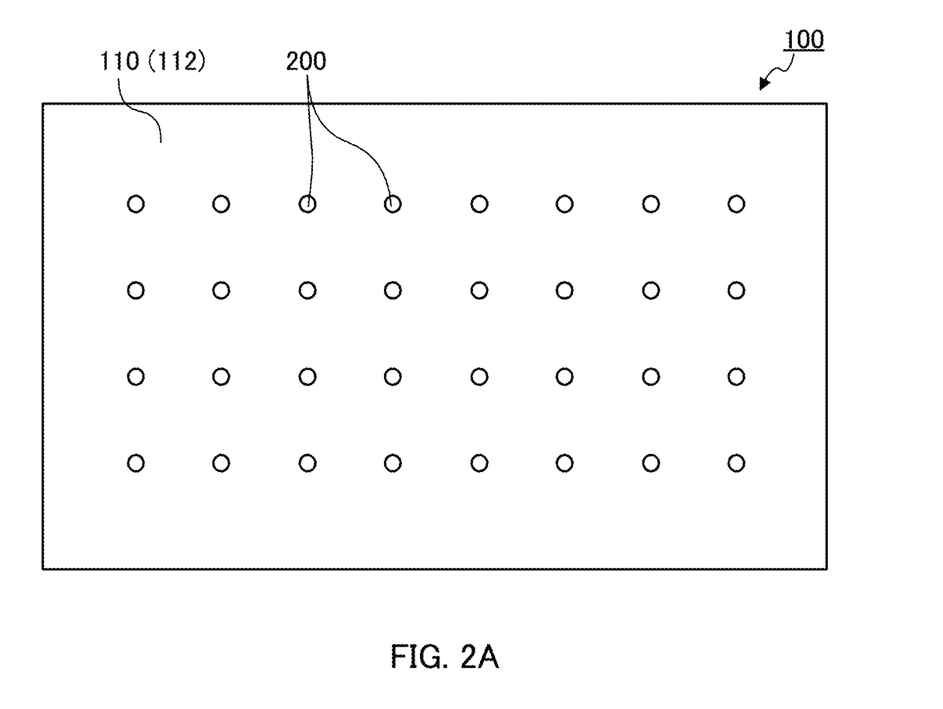
FIGS. 2A and 2B also illustrate the configuration of the surface light source device according to the embodiment of the present invention.
Figure 2B:
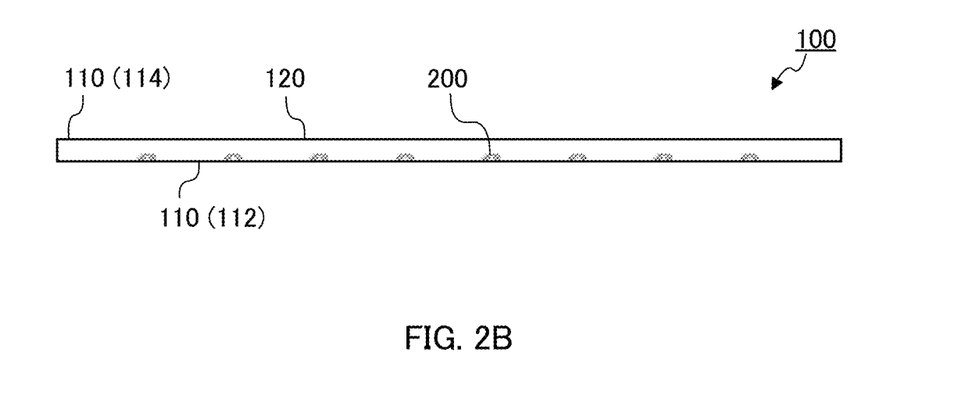
Figure 3:
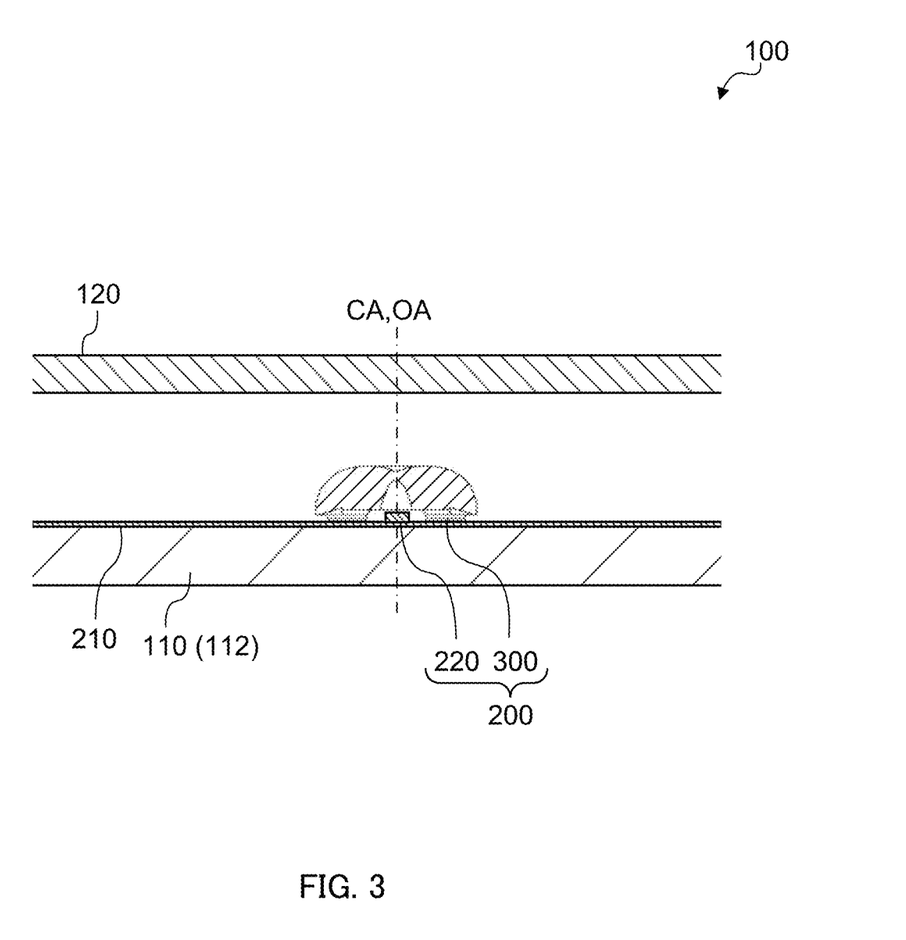
FIG. 3 is a partially enlarged cross-sectional view illustrating an enlarged part of FIG. 2B.

FIGS. 1A, 1B, 2A, 2B, and 3 schematically illustrate a configuration of surface light source device 100 according to the embodiment of the present invention. FIG. 1A is a plan view and FIG. 1B is a front view of surface light source device 100 according to the embodiment of the present invention. FIG. 2A is a cross-sectional view taken along line A-A of FIG. 1B, and FIG. 2B is a cross-sectional view taken along line B-B of FIG. 1A. FIG. 3 is a partially enlarged cross-sectional view illustrating an enlarged part of FIG. 2B.

As illustrated in FIGS. 1A, 1B, 2A, 2B, and 3, surface light source device 100 includes casing 110, plurality of light emitting devices 200, and light diffusion member 120.

Figure 6A:
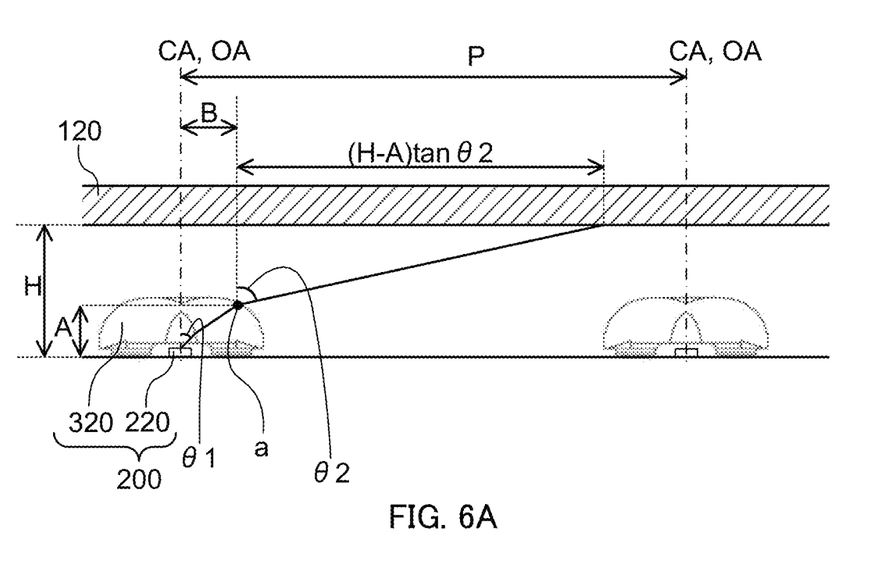
FIGS. 6A and 6B are schematic views for explaining the features of the surface light source device.
Figure 6B:
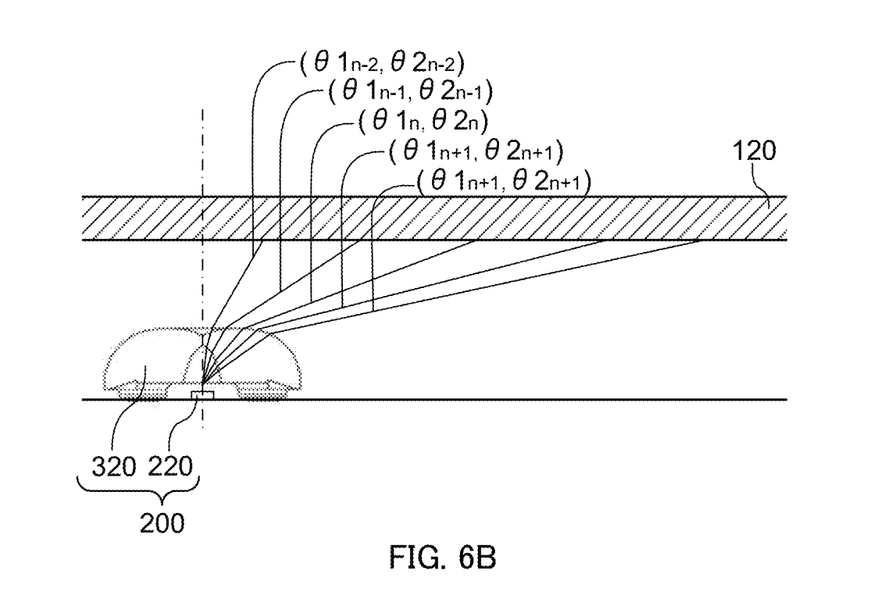

The inner surface of bottom plate 112 of casing 110 functions as a diffusive reflection surface. On bottom plate 112, substrate 210 provided with light emitting devices 200 is disposed at a predetermined position. In addition, top plate 114 of casing 110 is provided with an opening. Light diffusion member 120 is disposed to close the opening, and functions as a light emitting surface. The size of the light emitting surface may be about 400 mm×about 700 mm. In the present embodiment, distance H between substrate 210 and light diffusion member 120 is preferably 10 mm or less, more preferably 5 to 7 mm (see FIG. 6). Distance H exceeding 10 mm may prevent exertion of the effect of the present invention.

Plurality of light emitting devices 200 are arranged in a grid pattern on substrate 210 disposed on bottom plate 112 of casing 110. Herein, "arranged in a grid pattern" means that the unit grids are arranged so that each unit grid forms a polygon. Examples of the unit grid include rectangular grids, square grids (square grids), and triangular grids. In the present embodiment, plurality of light emitting devices 200 are arranged in a square grid pattern. Each light emitting device 200 includes light emitting element 220 and light flux controlling member 300.

The ratio of distance H to distance P is preferably 0.21 or more, and more preferably 0.25 to 0.35. Here, distance P refers to the distance between central axis CA of a light emitting device 200 (first light emitting device) and central axis CA of another light emitting device 200 (second light emitting device) adjacent to this light emitting device 200 (first light emitting device) among plurality of light emitting devices 200. Distance H refers to the distance between substrate 210 and light diffusion member 120. In other words, the present embodiment is particularly effective in thin surface light source device 100.

As described in detail below, in at least one light emitting device 200 among plurality of light emitting devices 200, light—emitted from the light emitting center of light emitting element 220 at an emission angle of 80° or less with respect to the optical axis of light emitting element 220, incident on incidence surface 310, and emitted from emission surface 320—reaches light diffusion member 120 without reaching other light emitting devices 200 among plurality of light emitting devices 200. In addition, in light emitting device 200 that is disposed at a position other than the outermost position of plurality of light emitting devices 200, light—emitted from the light emitting center of light emitting element 220 at an emission angle θ1 of 80° or less with respect to optical axis OA of light emitting element 220, incident on incidence surface 310, and emitted from emission surface 320—reaches light diffusion member 120 without passing through other members. In light emitting device 200, disposed on the outermost side, among plurality of light emitting devices 200 disposed in a grid pattern, light emitted outward from emission surface 320 may reach light diffusion member 120 after being reflected by casing 110, or may reach light diffusion member 120 directly.

Light emitting elements 220 are light sources of surface light source device 100 and are mounted on substrate 210. Light emitting element 220 is, for example, a light emitting diode (LED), such as a white light emitting diode. In the present embodiment, light emitting element 220 is disposed in such a way that the light emitting center (and optical axis OA) thereof is located on central axis CA of light flux controlling member 300. Herein, "optical axis OA of light emitting element 220" means a central light beam of a stereoscopic emission light flux from light emitting element 220. The light emitting surface of light emitting element 220 may be disposed at the same height as the back surface of light flux control member 300, or may be disposed at a position lower than the back surface of light flux control member 300. In the present embodiment, the light emitting surface of light emitting element 220 is disposed at a position (on the substrate 210 side) lower than the back surface of light flux control member 300.

Light flux controlling member 300 is a diffusion lens and fixed to substrate 210. Light flux controlling member 300 is configured to controls the distribution of light emitted from light emitting element 220, and expands the traveling direction of the light in the planar direction of surface 210. Light flux controlling member 300 is disposed over light emitting element 220 in such a way that central axis CA of the light flux controlling member coincides with optical axis OA of light emitting element 220 (see FIG. 3). Below described incidence surface 310 and emission surface 320 of light flux controlling member 300 are rotationally symmetric (circular symmetric in the present embodiment), and the rotation axes of the surfaces coincide with optical axis OA of light emitting element 220. The rotation axes of incidence surface 310 and emission surface 320 are each referred to as "central axis CA of light flux controlling member 300."

Light flux controlling member 300 may be formed by integral molding. Any material that allows light with a desired wavelength to pass therethrough may be used as the material of light flux controlling member 300. The material of light flux controlling member 300 is an optically transparent resin, such as polymethyl methacrylate (PMMA), polycarbonate (PC), epoxy resin (EP), or silicone resin, or glass. The features to be included in light flux controlling member 300 will be described in detail separately.

Light diffusion member 120 is a plate-shaped member having a light diffusing property, and configured to transmit light emitted from light emitting device 200 while diffusing the light. Light diffusion member 120 is disposed above plurality of light emitting devices 200 and substantially parallel to the surface of substrate 210. Normally, the size of light diffusion member 120 is substantially the same as that of the member to be irradiated, such as a liquid crystal panel. Light diffusion member 120 is formed of, for example, an optically transparent resin, such as polymethyl methacrylate (PMMA), polycarbonate (PC), polystyrene (PS), or a styrene-methylmethacrylate copolymer resin (MS). For providing a light diffusing property, minute irregularities are formed on the surface of light diffusion member 120, or light diffusing members, such as beads, are dispersed inside light diffusion member 120.

In surface light source device 100 according to the present invention, light emitted from each light emitting element 220 is controlled by light flux controlling member 300 so as to illuminate a predetermined irradiation region of light diffusion member 120. As described below, each light emitting device 200 appropriately illuminates a predetermined irradiation region in light diffusion member 120. Therefore, the inner surface of light diffusion member 120 is substantially uniformly illuminated. The light that has reached light diffusion member 120 from each light emitting device 200 (light flux controlling member 300) passes through light diffusion member 120 while being diffused. Surface light source device 100 according to the present invention can thus uniformly illuminate a planar member to be irradiated (e.g., a liquid crystal panel).

Configuration of Light Flux Controlling Member

Figure 4A:
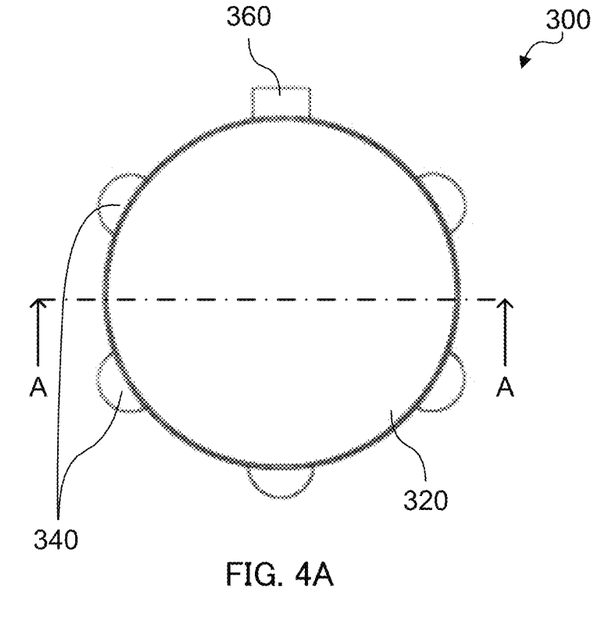
FIGS. 4A and 4B illustrate a configuration of a light flux controlling member in the embodiment of the present invention.
Figure 4B:
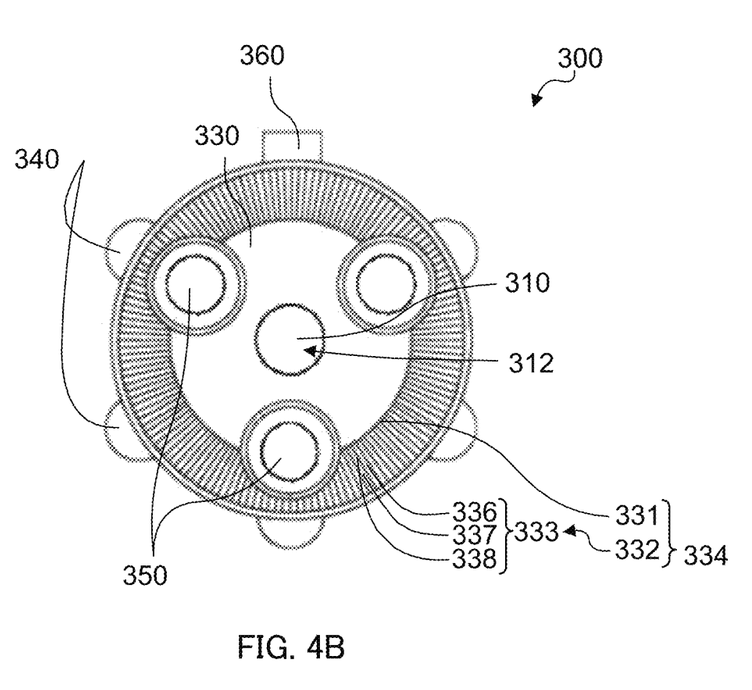
Figure 5A:
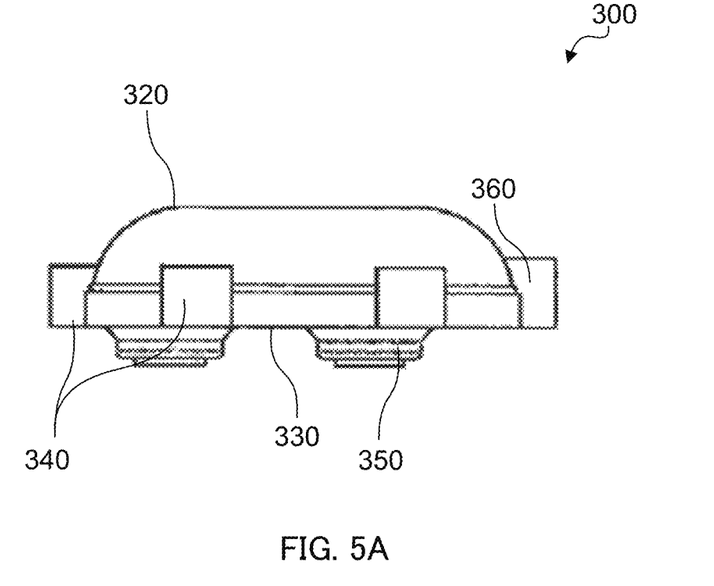
FIGS. 5A and 5B also illustrate the configuration of the light flux controlling member in the embodiment of the present invention.
Figure 5B:
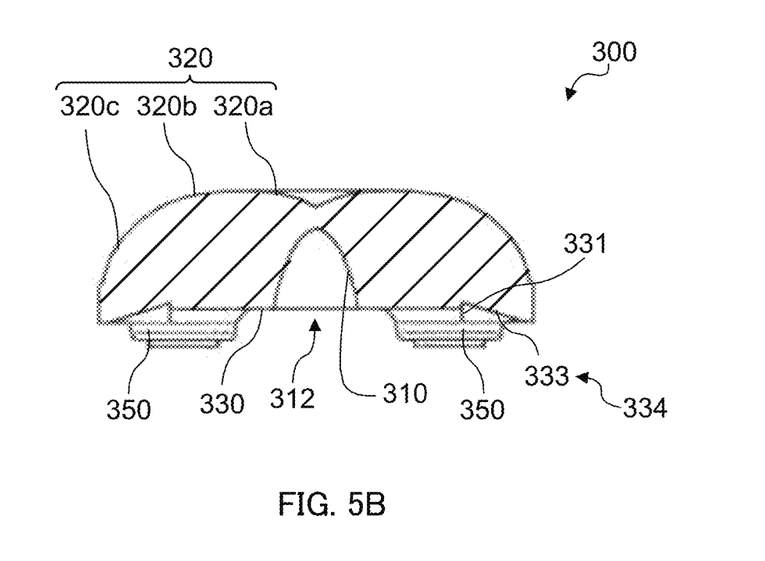

FIGS. 4A, 4B, 5A, and 5B illustrate a configuration of light flux controlling member 300. FIG. 4A is a plan view of light flux controlling member 300. FIG. 4B is a bottom view of light flux controlling member 300. FIG. 5A is a right side view of light flux controlling member 300. FIG. 5B is a cross-sectional view taken along line A-A of FIG. 4A.

As illustrated in FIGS. 4A, 4B, 5A, and 5B, light flux controlling member 300 includes incidence surface 310, emission surface 320, back surface 330, at least one flange 340, and at least one leg 350 in the present embodiment. In the present embodiment, gate mark 360 remains.

Incidence surface 310 allows the majority of light emitted from light emitting element 220 to enter light flux controlling member 300, while controlling the travelling direction of the light. Incidence surface 310 is the inner surface of recess 312 that opens onto the back side of the light flux controlling member. Recess 312 opens onto the central portion of back surface 330 so as to intersect central axis CA of light flux controlling member 300 (optical axis OA of light emitting element 220) (see FIG. 5B). In other words, incidence surface 310 is disposed so as to intersect central axis CA (optical axis OA). Incidence surface 310 intersects central axis CA of light flux controlling member 300 and is rotationally symmetric (circular symmetric in the present embodiment) with central axis CA as the rotation axis.

Emission surface 320 is disposed on the front side (the light diffusion member 120 side) of light flux controlling member 300. Emission surface 320 emits the light having entered light flux controlling member 300 to the outside of light flux controlling member 300 while controlling the travelling direction of the light. Emission surface 320 intersects central axis CA and is rotationally symmetric (circular symmetric in the present embodiment) with central axis CA as the rotation axis.

In the present embodiment, emission surface 320 includes first emission surface 320a located in a predetermined range with central axis CA at the center, second emission surface 320b continuously formed around first emission surface 320a, and third emission surface 320c connecting second emission surface 320b with flanges 340 (see FIG. 5B). First emission surface 320a is a curved surface that is convex toward the back side. Second emission surface 320b is a smoothly curved surface that is convex in a direction from the back side toward the front side, and is located around first emission surface 320a. Second emission surface 320b has a shape of a convex ring. Third emission surface 320c is a curved surface located around second emission surface 320b.

Back surface 330 is located on the back side of light flux controlling member 300 and connected to the opening edge of recess 312, and extends from the opening edge of recess 312. In the present embodiment, annular groove 334 including plurality of protrusions 333 is disposed in back surface 330.

Annular groove 334 is formed in back surface 330 so as to encircle recess 312 (incidence surface 310). Annular groove 334 is rotationally symmetric about central axis CA. Annular groove 334 includes first inner surface 331 disposed on the central axis CA side and second inner surface 332 disposed farther from central axis CA than first inner surface 331 is. Plurality of protrusions 333 are disposed on second inner surface 332.

First inner surface 331 may be disposed so as to be parallel to central axis CA, or may be inclined toward the front side as the distance from the first inner surface to central axis CA increases. In the present embodiment, first inner surface 331 is disposed so as to be parallel to central axis CA.

Second inner surface 332 is formed on the back side of light flux controlling member 300 so as to encircle first inner surface 331. Second inner surface 332 is inclined toward the back side as the distance from the second inner surface to central axis CA increases.

Annular groove 334 may be appropriately located in back surface 330. In back surface 330, annular groove 334 is preferably formed in a region where a large amount of light internally reflected by emission surface 320 reaches. Second inner surface 332 is located in the above-described region. The position, where light reflected by emission surface 320 reaches, changes depending on various factors, such as the shape of emission surface 320. The position is thus appropriately set according to light flux controlling member 300. The light internally reflected by emission surface 320 has substantially no effect on the luminance distribution on light diffusion member 120.

The cross section that is orthogonal to ridge line 338 in each protrusion 333 is substantially triangular. In addition, plurality of protrusions 333 are formed so as to be rotationally symmetric (n times symmetric when the number of protrusions 333 is n) about central axis CA. Each protrusion 333 includes planar first inclined surface 336, planar second inclined surface 337, and ridge line 338 disposed between first inclined surface 336 and second inclined surface 337, and functions like a total internal reflection prism. Ridge line 338 is inclined toward the back surface 330 side as the distance from the ridge line to central axis CA increases. Plurality of protrusions 333 reflect light internally reflected by emission surface 320 toward light diffusion member 120.

Flange 340 is disposed on the outer peripheral portion of light flux controlling member 300. Flange 340 facilitates the handling of light flux controlling member 300. The number of flanges 340 is not limited. The number of flanges 340 may be one or more than one. In the present embodiment, the number of flanges 340 is 5. The shape of flange 340 in plan view is also not limited. In the present embodiment, the shape of flange 340 in plan view is substantially semicircular.

Leg 350 is used for fixing light flux controlling member 300 to substrate 210. The shape of leg 350 can be appropriately set as long as the above-described function can be exhibited. In the present embodiment, leg 350 is formed in a substantially columnar shape. The number of legs 350 is not limited. The number of legs 350 may be one or more than one. In the present embodiment, the number of legs 350 is 3.

Simulation

Hereinafter, optical paths of light emitted from light emitting element 220 will be described in detail. For comparison, the optical paths of light emitted from light emitting device 200A in surface light source device 100A having no feature of surface light source device 100 according to the present embodiment were also studied. FIGS. 6A and 6B are schematic views for explaining the optical paths of light emitted from light emitting device 220. FIG. 6A is a diagram for explaining a position where light emitted from light emitting device 200 reaches in light diffusion member 120. FIG. 6B shows the relationship between the emission angle of light emitted from light emitting element 220 (first emission angle, namely emission angle θ1) and the emission angle of light emitted from light flux controlling member 300 (second emission angle, namely angle θ2).

Figure 7A:
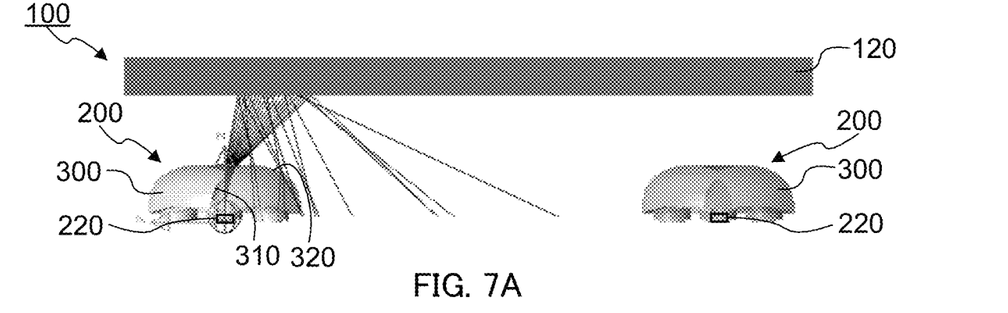
FIGS. 7A to 7D illustrate optical paths in the surface light source device according to the present embodiment.
Figure 7B:
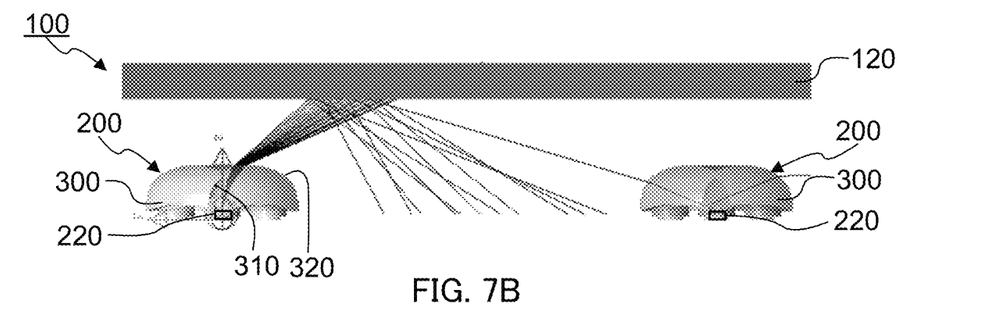
Figure 7C:
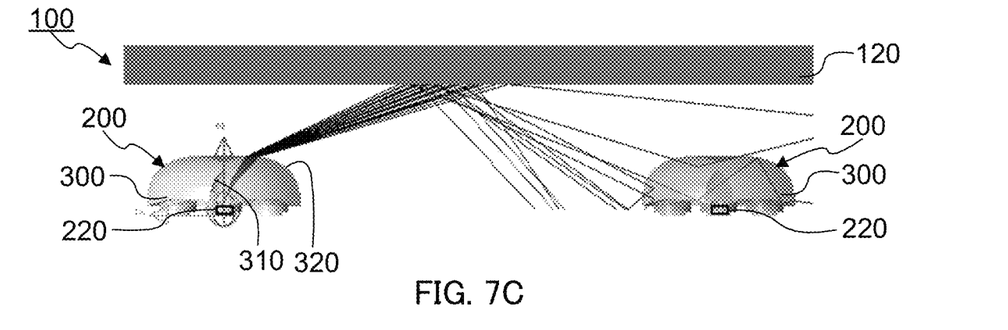
Figure 7D:
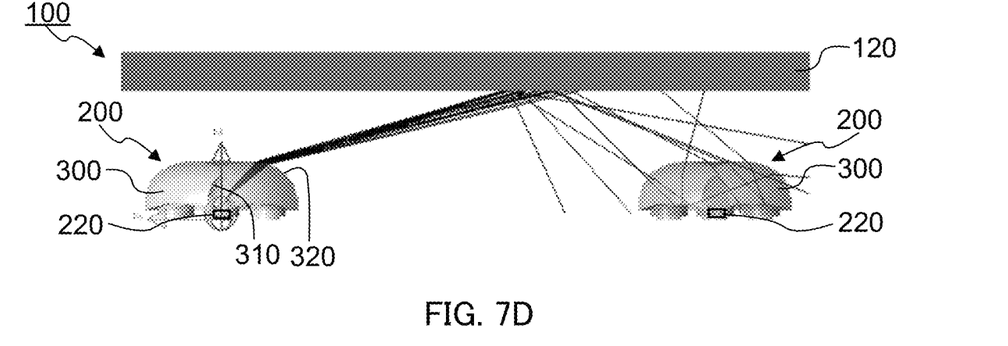
Figure 8A:
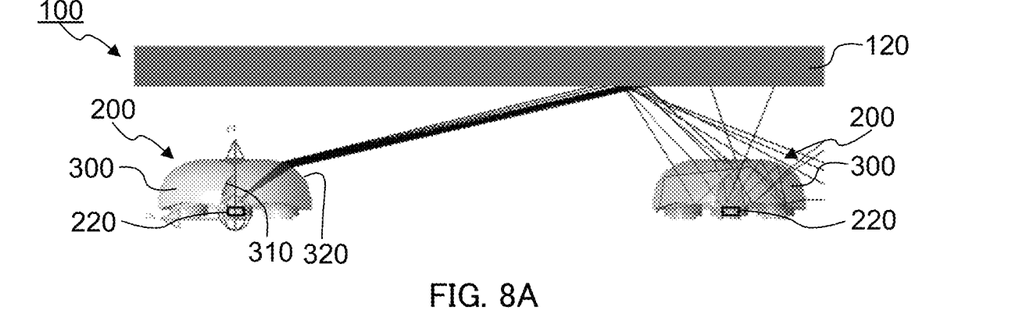
FIGS. 8A to 8D also illustrate optical paths in the surface light source device according to the present embodiment.
Figure 8B:
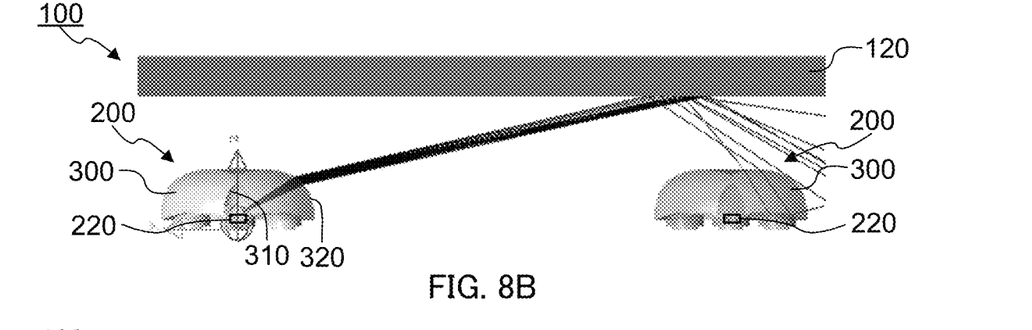
Figure 8C:
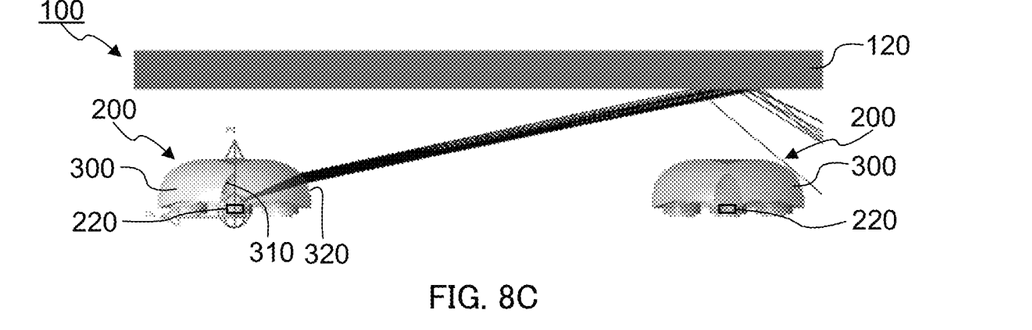
Figure 8D:
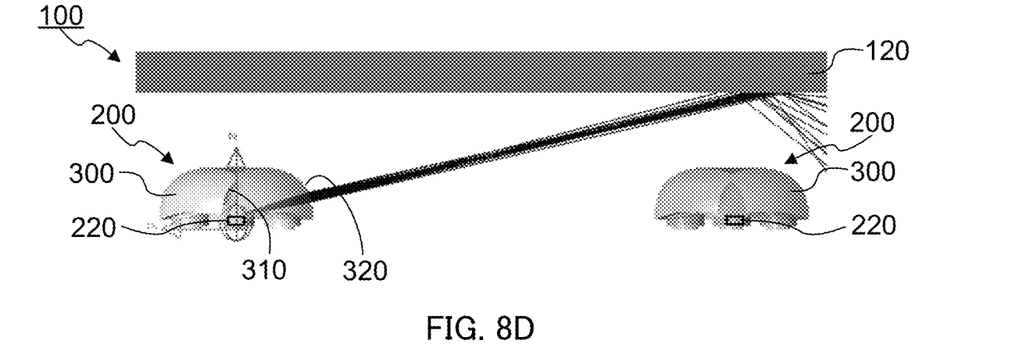

FIGS. 7A to 7D and FIGS. 8A to 8D each illustrate optical paths of light emitted from light emitting device 200 in surface light source device 100 according to the present embodiment. FIG. 7A illustrates the optical paths of light whose emission angle θ1 is more than 0° and 10° or less. FIG. 7B illustrates the optical paths of light whose emission angle θ1 is more than 10° and 20° or less. FIG. 7C illustrates the optical paths of light whose emission angle θ1 is more than 20° and 30° or less. FIG. 7D illustrates the optical paths of light whose emission angle θ1 is more than 30° and 40° or less. FIG. 8A illustrates the optical paths of light whose emission angle θ1 is more than 40° and 50° or less. FIG. 8B illustrates the optical paths of light whose emission angle θ1 is more than 50° and 60° or less. FIG. 8C illustrates the optical paths of light whose emission angle θ1 is more than 60° and 70° or less. FIG. 8D illustrates the optical paths of light whose emission angle θ1 is more than 70° and 80° or less. In these drawings, the light after being reflected by substrate 210 is omitted.

Figure 9A:
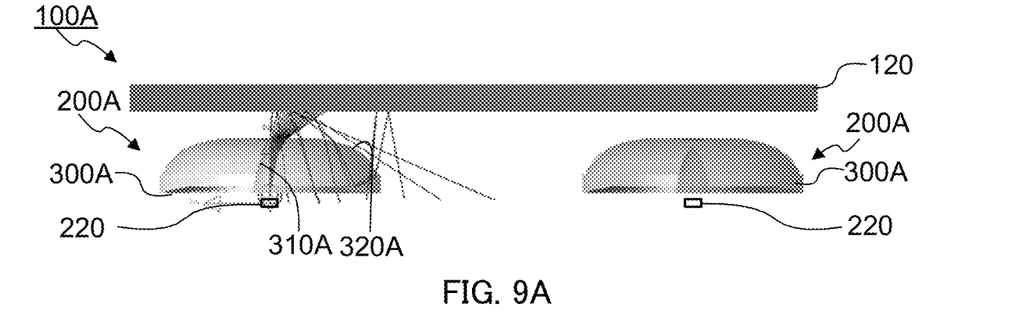
FIGS. 9A to 9D illustrate optical paths in a surface light source device according to a comparative example.
Figure 9B:
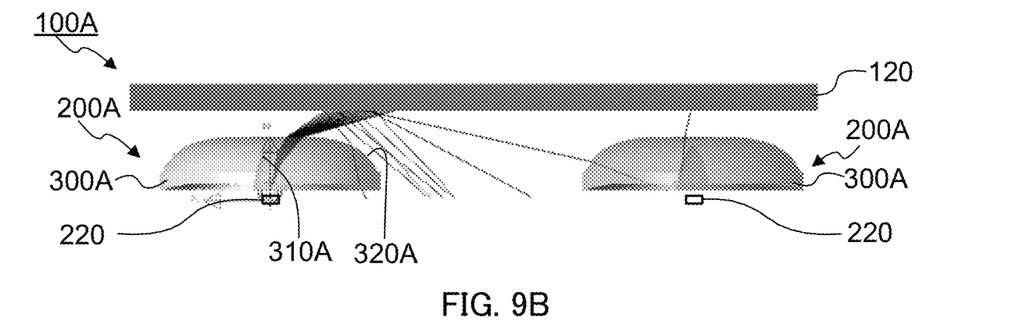
Figure 9C:
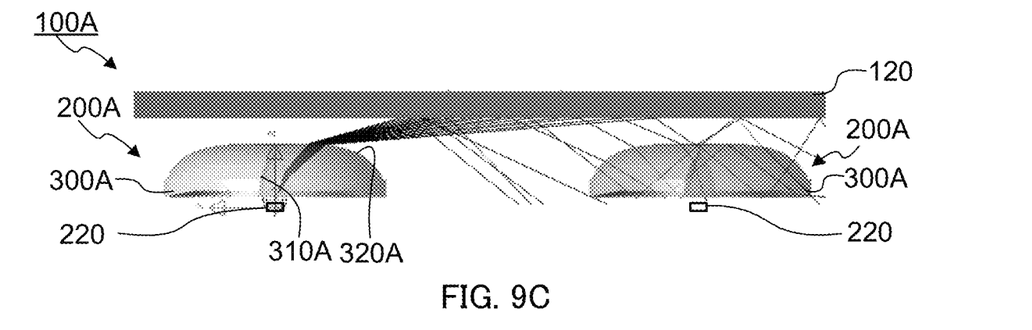
Figure 9D:
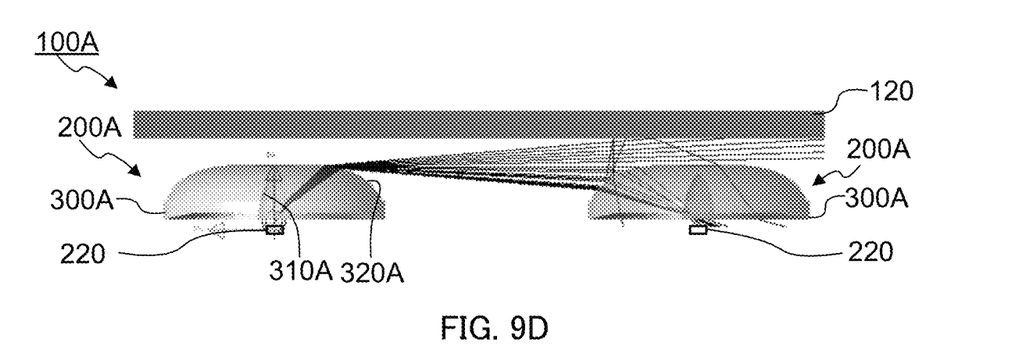
Figure 10A:
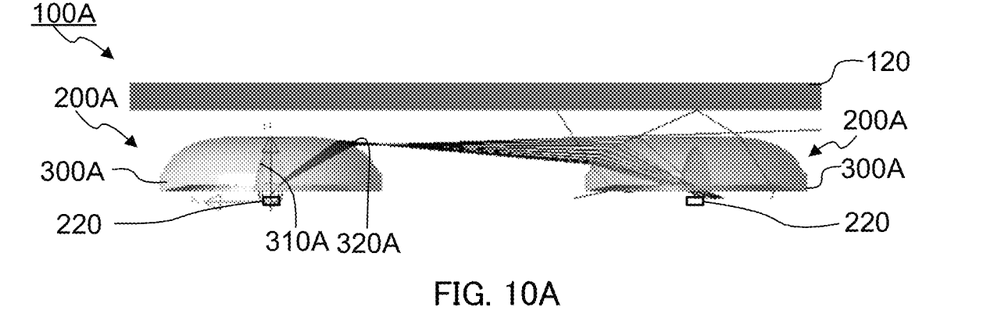
FIGS. 10A to 10D also illustrate optical paths in the surface light source device according to the comparative example.
Figure 10B:
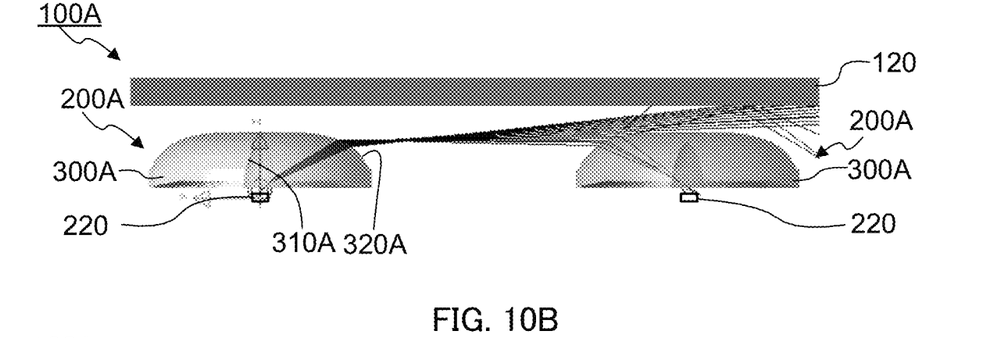
Figure 10C:
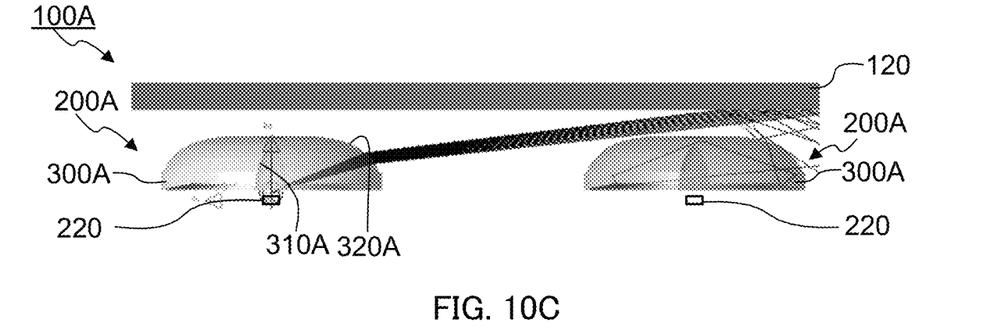
Figure 10D:
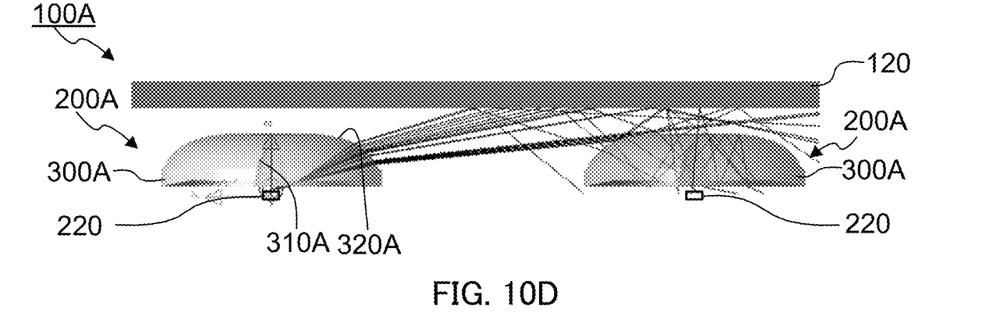

FIGS. 9A to 9D and FIGS. 10A to 10D each illustrate optical paths of light emitted from light emitting device 200A in surface light source device 100A according to the comparative example. FIG. 9A illustrates the optical paths of light whose emission angle θ1 is more than 0° and 10° or less. FIG. 9B illustrates the optical paths of light whose emission angle θ1 is more than 10° and 20° or less. FIG. 9C illustrates the optical paths of light whose emission angle θ1 is more than 20° and 30° or less. FIG. 9D illustrates the optical paths of light whose emission angle θ1 is more than 30° and 40° or less. FIG. 10A illustrates the optical paths of light whose emission angle θ1 is more than 40° and 50° or less. FIG. 10B illustrates the optical paths of light whose emission angle θ1 is more than 50° and 60° or less. FIG. 10C illustrates the optical paths of light whose emission angle θ1 is more than 60° and 70° or less. FIG. 10D illustrates the optical paths of light whose emission angle θ1 is more than 70° and 80° or less. In these drawings, the light after being reflected by substrate 210 is omitted.

In these drawings, distance H between the surface of substrate 210 and the back surface of light diffusion member 120 is 5 mm. In addition, center-to-center distance P of adjacent light emitting devices 200 is 20 mm. The minimum diameter (the minimum diameter on the line A-A in FIG. 4) of light flux controlling member 300 in plan view in surface light source device 100 according to the present embodiment is 6.2 mm. The minimum diameter (the minimum diameter on the line A-A in FIG. 4) of light flux controlling member 300A in plan view in surface light source device 100A according to the comparative example is 12.0 mm. In these drawings, the hatching of light flux controlling members 300 and 300A is omitted. Light flux controlling member 300 in the present embodiment and light flux controlling member 300A according to the comparative example are different from each other in the shape of the incidence surface (310, 310A) and the shape of the emission surface (320, 320A).

For surface light source device 100 according to the present embodiment, FIGS. 6A, 7A to 7D, and 8A to 8D show the following. In one light emitting device 200 among plurality of light emitting devices 200, light—emitted from the light emitting center of light emitting element 220 at emission angle θ1 of 80° or less with respect to optical axis OA of light emitting element 220, incident on incidence surface 310, and emitted from emission surface 320—reaches light diffusion member 120 without reaching other light emitting devices 200 among plurality of light emitting devices 200. In this manner, the majority of light emitted from light emitting device 200 directly reaches light diffusion member 120 without reaching adjacent light emitting device 200 and without reaching other members. In other words, in light flux controlling member 300 according to the present embodiment, incidence surface 310 and emission surface 320 are formed in such a way that light emitted from light emitting element 220 travels as described above. Here, light incident on incidence surface 310 and internally reflected by emission surface 320 is not taken into account. The same applies to the following descriptions.

As illustrated in FIGS. 6A, 7A to 7D, and 8A, Expression 1, namely $0<(H-A)\tan\theta_2\leq(P-B)$, is preferably satisfied under the following assumption and conditions: 1) in first light emitting device 200 among plurality of light emitting devices 200, light—emitted from the light emitting center of light emitting element 220 at emission angle θ1 (where 0°<θ1≤50°) with respect to optical axis OA of light emitting element 220—is incident on incidence surface 310, and emitted from point a in emission surface 320 at angle θ2 with respect to a straight line parallel to optical axis OA; 2) P represents the distance between central axis CA of first light emitting device 200 and central axis CA of second light emitting device 200 adjacent to first light emitting device 200 among plurality of light emitting devices 200; 3) H represents the distance between substrate 210 and light diffusion member 120; 4) A represents the distance between point a and substrate 210; and 5) B represents the distance between point a and central axis CA in first light emitting device 200. In other words, regarding two adjacent light emitting devices 200 respectively located on the both ends of a side of a grid, light—emitted at angle θ1 of more than 0° and 50° or less in one of the two light emitting devices 200—reaches a region of light diffusion member 120 closer to the one light emitting device 200 than central axis CA of the other adjacent light emitting device 200 is. The above configuration allows light emitted from light emitting device 200 to reach only a predetermined region in light diffusion member 120.

In addition, as illustrated in FIGS. 6A, 7A to 7D, 8A, and 8B, Expression 2 below is preferably further satisfied under the assumption, that is, in one light emitting device 200 among plurality of light emitting devices 200, light—emitted from the light emitting center of light emitting element 220 at emission angle θ1 (where 0°<θ1≤60°) with respect to optical axis OA of light emitting element 220—is incident on incidence surface 310, and emitted from point a in emission surface 320 at angle θ2 with respect to a straight line parallel to optical axis OA:

$$\Delta\theta 2/\Delta\theta 1 \geq 0 \quad \text{Expression 2}$$

where Δθ2/Δθ1 is the slope of the tangent of a curve indicated in a graph of the value of θ2 accompanying the change of θ1 with abscissa θ1 and ordinate θ2.

In other words, within the range where θ1 is more than 0° and is equals to 60° or less in light emitting device 200, angle θ2 of light emitted from emission surface 320 preferably increases as emission angle θ1 in light emitting element 220 increases. This configuration allows light with a large light intensity to reach a desired region of light diffusion member 120, thereby reducing luminance unevenness. In the present embodiment, light having θ1 of 60° reaches light diffusion member 120 directly above the other adjacent light emitting device 200.

On the other hand, Expression 3 below is preferably satisfied when emission angle θ1 is more than 60° and less than 80°.

$$\Delta\theta 2/\Delta\theta 1 < 0 \quad \text{Expression 3}$$

In other words, regarding two adjacent light emitting devices 200 corresponding to the sides of a grid, within the range where θ1 is more than 60° and less than 80° in one of the two light emitting devices 200, angle θ2 of light emitted from emission surface 320 preferably decreases as emission angle θ1 in light emitting element 220 increases. It should be noted that the light intensity of light whose angle θ2 is in the range of more than 60° and less than 80° is smaller than that of light whose angle θ2 is equals to 60° or less. Such light with small light intensity has substantially no effect on the luminance distribution on light diffusion member 120.

Although not illustrated, light having emission angle θ1 of more than 80° is incident on back surface 330, not on incidence surface 310, and is emitted from emission surface 320. Such light has small light intensity as compared to light having other emission angles, and therefore has substantially no effect on the luminance distribution on light diffusion member 120.

On the other hand, as illustrated in FIGS. 9A to 9D and 10A to 10D (in particular, as illustrated in FIGS. 9D and 10A), for surface light source device 100A according to the comparative example, part of light emitted from light emitting device 200A directly reached adjacent light emitting device 200A when the light has angle θ2 of 35° or more and less than 55° from emission surface 320A. The drawings show the following: the light directly reaching adjacent light emitting device 200A reaches substrate 210 while being condensed in the vicinity of light emitting element 220 by emission surface 320A and the incidence surface 310A of light flux controlling member 300A. Although not illustrated, the light that has reached substrate 210 is reflected by substrate 210, passes through light flux controlling member 300A again, and reaches an unintended region in light diffusion member 120.

Effects

In surface light source device 100 according to the present embodiment, light emitted from light emitting device 200 does not directly reach adjacent light emitting device 200, but directly reaches light diffusion member 120. This configuration allows light to reach light diffusion member 120 at a desired position. Accordingly, surface light source device 100 according to the present embodiment can reduce luminance unevenness.

INDUSTRIAL APPLICABILITY

The light emitting device and the surface light source device according to the present invention can be applied to, for example, a backlight of a liquid crystal display device and general-purpose lighting.

REFERENCE SIGNS LIST 100, 100A Surface light source device
100' Display device
102 Display member
110 Casing
112 Bottom plate
114 Top plate
120 Light diffusion member
200, 200A Light emitting device
210 Substrate
220 Light emitting element
300, 300A Light flux controlling member
310, 310A Incidence surface
312 Recess
320, 320A Emission surface
320a First emission surface
320b Second emission surface
320c Third emission surface
330 Back surface
331 First inner surface
332 Second inner surface
333 Protrusion
334 Annular groove
336 First inclined surface
337 Second inclined surface
338 Ridge line
340 Flange
350 Leg
360 Gate mark
CA Central axis
OA Optical axis
θ1 Emission angle
θ2 Angle

What is claimed is:

1. A surface light source device, comprising:
a substrate;
a plurality of light emitting devices each including a light emitting element disposed on the substrate and a light flux controlling member for controlling a distribution of light emitted from the light emitting element; and
a light diffusion member for transmitting light emitted from the plurality of light emitting devices while diffusing the light,
wherein the light flux controlling member includes
an incidence surface that is an inner surface of a recess disposed on a back side of the light flux controlling member so as to intersect a central axis of the light flux controlling member, the incidence surface being for allowing incidence of the light emitted from the light emitting element, and
an emission surface disposed on a front side of the light flux controlling member so as to intersect the central axis, the emission surface being for allowing emission of the light incident on the incidence surface to an outside of the light flux controlling member, and wherein, in at least one light emitting device among the plurality of light emitting devices, regarding light that is emitted from a light emitting center of the light emitting element at an emission angle of 80° or less with respect to an optical axis of the light emitting element, incident on the incidence surface, and emitted from the emission surface, the light reaches the light diffusion member without reaching another light emitting device among the plurality of light emitting devices.

2. The surface light source device according to claim 1, wherein:

the surface light source device satisfies Expression 1 below, assuming that, in a first light emitting device among the plurality of light emitting devices, light emitted from the light emitting center of the light emitting element at an emission angle $\theta 1$ (where $0°<\theta 1 \leq 50°$) with respect to the optical axis of the light emitting element is incident on the incidence surface and emitted from a point a in the emission surface at an angle $\theta 2$ with respect to a straight line parallel to the optical axis:

$$0<(H-A)\tan \theta 2 \leq (P-B) \qquad \text{[Expression 1]}$$

where

P represents a distance between the central axis of the first light emitting device and the central axis of a second light emitting device adjacent to the first light emitting device among the plurality of light emitting devices, H represents a distance between the substrate and the light diffusion member, A represents a distance between the point a and the substrate, and B represents a distance between the point a and the central axis in the first light emitting device.

3. The surface light source device according to claim 1, wherein:

the surface light source device further satisfies Expression 2 below, assuming that, in the at least one light emitting device among the plurality of light emitting devices, light emitted from the light emitting center of the light emitting element at an emission angle $\theta 1$ (where $0°<\theta 1 \leq 60°$) with respect to the optical axis of the light emitting element is incident on the incidence surface and emitted from a point a in the emission surface at an angle $\theta 2$ with respect to a straight line parallel to the optical axis:

$$\Delta \theta 2/\Delta \theta 1 \geq 0 \qquad \text{[Expression 2]}$$

where $\Delta \theta 2/\Delta \theta 1$ is a slope of a tangent of a curve indicated in a graph with abscissa $\theta 1$ and ordinate $\theta 2$.

4. The surface light source device according to claim 1, wherein:

the plurality of light emitting devices are disposed in a grid pattern; and in a light emitting device that is disposed at a position other than an outermost position of the plurality of light emitting devices, regarding the light that is emitted from the light emitting center of the light emitting element at the emission angle of 80° or less with respect to the optical axis of the light emitting element, incident on the incidence surface, and emitted from the emission surface, the light reaches the light diffusion member without passing through other members.

5. The surface light source device according to claim 1, wherein:

the incidence surface and the emission surface are each circular symmetric with the central axis as a rotation axis.

6. A display device, comprising:

the surface light source device according to claim 1; and a display member to be illuminated with light emitted from the surface light source device.

* * * * *